July 31, 1934.   W. J. JANAK   1,968,254
PREPARED NUT AND PROCESS OF PREPARING SAME
Filed Jan. 29, 1932

William J. Janak
By John F. Brezina

Patented July 31, 1934

1,968,254

UNITED STATES PATENT OFFICE 1,968,254

PREPARED NUT AND PROCESS OF PREPARING SAME

William J. Janak, Chicago, Ill.

Application January 29, 1932, Serial No. 589,764

7 Claims. (Cl. 99—8)

This invention relates to prepared and preserved nuts, nut meats and/or a delicacy consisting of unripened nuts prepared and preserved by a novel process to provide a highly delicious and nutritive food product.

An object of this invention is the provision of a delicacy or dessert of high nutritive and healthful properties consisting of both the nut and the core thereof in unripened state.

A further important object of my invention is the utilization of nuts through increased consumption by preparation thereof to an edible and pleasing state, as well as the combination thereof with edible preservatives.

My invention is applicable to any kind of nuts, and particularly to nuts in their unripened state and when the surrounding green core clings firmly to the semi-ripened inner shell.

Figure 1:
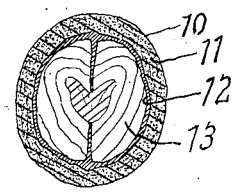
Fig. 1 is a cross sectional view through the center of an unripened walnut.

In Fig. 1 I have shown in cross section a walnut in an unripened stage, the reference numeral 10 representing the outer semi-hard green pericarp. The pericarp 10 surrounds the fibrous semi-soft pulpy core 11, which as is well known contains most of the natural juice during the ripening stage. 12 indicates the relatively harder inner shell which in an unripened nut is sufficiently soft to permit perforation thereof as I herein describe, this being the shell which becomes hard when the nut has fully ripened and which must be cracked to remove the edible nut meats. In an unripened stage the nut meats, indicated by the reference numeral 13, are soft and pulpy and fill substantially all of the space within the shell 12, as indicated in the drawing.

Figure 2:
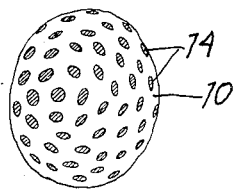
Fig. 2 is an elevational view of the outside of the nut after the outer pericarp, pulp and inner nut have been perforated.
Figure 3:
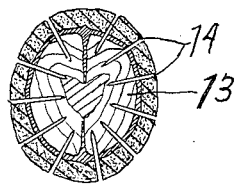
Fig. 3 is a cross sectional view through the center of Fig. 2 illustrating the perforations.

The first step of my preferred method of the process is to take unripened nuts having outer core 10 and pulp wall or core 11 thereon and which preferably have ripened to a stage just before the inner shell begins to harden, and perforate the outer core 10 and the pulp wall or core 11 and the inner nut shell 12 by running them through a pair of spaced apart rollers having a plurality of sharp radial prongs thereon to form a plurality of perforations 14. The perforations indicated by reference numeral 14 in Figs. 2 and 3 may also be accomplished by cutting or slicing the outer core and wall at a number of points thereon. The same method may be employed where it is desired to remove unripened cores and perforate only the inner unripened nut, and then to follow the same process as hereafter described.

The second step comprises the extraction of substantially all of the natural juice from the pulp of the core and from the inner nut. This extraction process may be done in various ways, but the preferred method consists of repeated flotation; namely, the soaking of the pierced unripened nuts in water, alcohol or other solvent to dissolve and draw out the natural juice from said core. This step may be repeated a number of times, and particularly as soon as one solution is fairly well saturated with the natural juice. I have found that this process requires from five to twenty days, depending upon the kinds of nuts and the extent to which they have ripened.

After substantially all of the natural juice and acid is extracted from the unripened perforated nuts, the nuts are cooked in water until the whole is soft and the inner shell may be easily punctured or cut.

After the nuts have been cooked they are removed from the water and allowed to cool and are then combined and packed with a syrup, either flavored or unflavored, as desired, the volume of syrup preferably being substantially equal to the volume of nuts. The cooked and cooled nuts may also be packed in alcohol or syrup combined, or other liquid preservative which has been flavored or spiced to give the finished product the desired taste.

The combined nuts and syrup is slowly cooked in the cooker for a comparatively long time so that the flavored syrup will permeate the nut tissue throughout and impart its particular flavor thereto. Then the recooked mixture of syrup and nuts is packed in containers, tins or glass jars, and processed in the well known manner so that the bacteria are destroyed and rendered inactive, by placing the sealed container containing the prepared product while it is hot in water and allowed to boil slowly for a short period of time to raise and maintain the temperature of the combined product to a degree which will kill and render inactive the remaining fermentation bacteria in the product.

The foregoing step may also be accomplished by a separation of the syrup and a reboiling thereof to accomplish the same object, although this procedure is not as economical or practical as the step first mentioned.

The substantial equivalent of the process described heretofore may be followed in the preparation of the product comprising nut meats and a syrup, alcohol, or vinegar, or a combination of any of these, or the nut meats may be combined as hereafter described with other edible liquid substances to which may be added various flavors and spices to attain various desired tastes and flavors.

In this modified form of my process I take a quantity of nut meats, either whole or partially divided, and place the same in a solution of water and syrup and flavored to the desired taste and degree, and cook the whole for a short period of time. After cooking, the mass is substantially sterilized and some of the water will be evaporated. I then add vinegar, alcohol, or additional syrup, which may be flavored with flavoring extract or spices to impart the desired flavor to the finished product. Then I place the cooked nut meats and cooking solution when hot into containers and seal the same in a well known manner. The food product made by this process has a highly delicious and pleasing taste and possesses high nutritive value.

I am aware that many changes may be made and numerous details of the process may be varied through a wide range without departing from the principles of this process, and I therefore do not purpose limiting the patent granted hereon otherwise than necessitated by the prior art.

I claim as my invention:

1. The process of preparing unripened nuts comprising piercing the core wall, extracting most of the juice from said core, then cooking the nuts until both the inner and outer shell are soft, and immersing the same in syrup.

2. The process of preparing unripened nuts comprising piercing the core wall; extracting most of the juice from said core, then cooking the nuts until both the inner and outer shell are soft, placing the same in a flavored syrup, and recooking the combined syrup and nuts therein.

3. The process of preparing unripened nuts including the outer core and pulp thereof by first perforating the outer core shell, extracting substantially all of the natural juices from said outer core, then cooking said nuts until the inner shell and outer core structure are soft, then immersing the same in syrup, and recooking the combined nuts and syrup.

4. The process of preparing unripened nut cores or the like comprising perforating the core pulp, extracting most of the natural juices thereof; placing the same in a liquid and cooking the whole for a short period of time, combining the same with a flavored preservative, and recooking the resultant product to kill substantially all of the fermentation bacteria.

5. The process of preparing unripened nuts and the cores thereon comprising piercing the core walls, extracting most of the natural juices; placing the same in a liquid and cooking the whole until the nuts and cores are soft and porous, injecting an edible preservative into the porous core body, and recooking the resultant product to kill substantially all of the fermentation bacteria.

6. A food product comprising a juiceless unripened nut the surrounding fibrous core structure and an edible preservative distributed throughout said fibrous core structure.

7. A food product comprising a cooked, flavored porous pulp of an unripened nut including a juiceless porous core having an edible preservative distributed throughout the porous core body.

WILLIAM J. JANAK.